(12) United States Patent
Matsuu et al.

(10) Patent No.: US 11,245,107 B2
(45) Date of Patent: Feb. 8, 2022

(54) POSITIVE ELECTRODE MIXTURE FOR SECONDARY BATTERY, METHOD FOR MANUFACTURING POSITIVE ELECTRODE FOR SECONDARY BATTERY, AND METHOD FOR MANUFACTURING SECONDARY BATTERY

(71) Applicant: NEC ENERGY DEVICES, LTD., Sagamihara (JP)

(72) Inventors: Masaaki Matsuu, Sagamihara (JP); Ai Fujisawa, Sagamihara (JP)

(73) Assignee: Envision AESC Japan Ltd., Zama (JP)

( * ) Notice: Subject to any disclaimer, the term of this patent is extended or adjusted under 35 U.S.C. 154(b) by 77 days.

(21) Appl. No.: 16/083,756

(22) PCT Filed: Dec. 9, 2016

(86) PCT No.: PCT/JP2016/086734
§ 371 (c)(1),
(2) Date: Sep. 10, 2018

(87) PCT Pub. No.: WO2017/158961
PCT Pub. Date: Sep. 21, 2017

(65) Prior Publication Data
US 2019/0051891 A1    Feb. 14, 2019

(30) Foreign Application Priority Data
Mar. 18, 2016 (JP) .............. JP2016-055170

(51) Int. Cl.
*H01M 4/36* (2006.01)
*H01M 4/505* (2010.01)
(Continued)

(52) U.S. Cl.
CPC ......... *H01M 4/364* (2013.01); *H01M 4/0404* (2013.01); *H01M 4/131* (2013.01);
(Continued)

(58) Field of Classification Search
CPC ........ H01M 4/36; H01M 4/366; H01M 4/505; H01M 4/525; H01M 4/62; H01M 4/623;
(Continued)

(56) References Cited

U.S. PATENT DOCUMENTS

| 5,932,632 A | 8/1999 | Biensan et al. |
| 2006/0204850 A1* | 9/2006 | Ham .................. H01M 4/131 |
| | | 429/231.3 |

(Continued)

FOREIGN PATENT DOCUMENTS

| JP | 9-306502 A | 11/1997 |
| JP | 10-074521 A | 3/1998 |

(Continued)

OTHER PUBLICATIONS

Extended European Search Report dated Sep. 26, 2019 issued by the European Patent Office in counterpart application No. 16894578.0.
(Continued)

*Primary Examiner* — Karie O'Neill Apicella
(74) *Attorney, Agent, or Firm* — Sughrue Mion, PLLC

(57) ABSTRACT

Provided is a positive electrode mixture for a secondary battery, the positive electrode mixture allowing provision of a secondary battery that exhibits a high capacity maintenance rate in a charge-discharge cycle. The positive electrode mixture for a secondary battery comprises a positive electrode active material, a binder, and an organic acid, wherein the positive electrode active material comprises a lithium nickel complex oxide having a layered crystal structure, the binder comprises a vinylidene fluoride-based polymer, and when a solution prepared by suspending the positive electrode active material in pure water has a pH of
(Continued)

A, and the content of the organic acid per 100 parts by mass of the positive electrode active material is B parts by mass, A and B satisfy the following expression (1).

$$30 \times B + 5 \leq A \leq 30 \times B + 10 \tag{1}$$

10 Claims, 1 Drawing Sheet

(51) Int. Cl.
  H01M 4/525   (2010.01)
  H01M 4/62    (2006.01)
  H01M 4/04    (2006.01)
  H01M 10/0525 (2010.01)
  H01M 10/058  (2010.01)
  H01M 10/44   (2006.01)
  H01M 4/131   (2010.01)
  H01M 4/02    (2006.01)

(52) U.S. Cl.
  CPC .......... *H01M 4/366* (2013.01); *H01M 4/505* (2013.01); *H01M 4/525* (2013.01); *H01M 4/62* (2013.01); *H01M 4/623* (2013.01); *H01M 10/058* (2013.01); *H01M 10/0525* (2013.01); *H01M 10/44* (2013.01); *H01M 2004/021* (2013.01); *H01M 2004/028* (2013.01)

(58) Field of Classification Search
  CPC .. H01M 4/04; H01M 4/0404; H01M 10/0525; H01M 10/058; H01M 10/44
  See application file for complete search history.

(56) References Cited

U.S. PATENT DOCUMENTS

| | | | | |
|---|---|---|---|---|
| 2013/0236783 | A1* | 9/2013 | Kose | H01M 4/623 |
| | | | | 429/211 |
| 2015/0089798 | A1* | 4/2015 | Tamura | H01M 4/139 |
| | | | | 29/623.1 |

FOREIGN PATENT DOCUMENTS

| | | | | |
|---|---|---|---|---|
| JP | 10-79244 A | | 3/1998 | |
| JP | 11-086846 A | | 3/1999 | |
| JP | 11-176422 A | | 7/1999 | |
| JP | 11-176425 A | | 7/1999 | |
| JP | 2001-035495 A | | 2/2001 | |
| JP | 2001035495 A | * | 2/2001 | ............ H01M 4/131 |
| JP | 2005-011594 A | | 1/2005 | |

OTHER PUBLICATIONS

International Search Report for PCT/JP2016/086734 dated Feb. 21, 2017 [PCT/ISA/210].

* cited by examiner

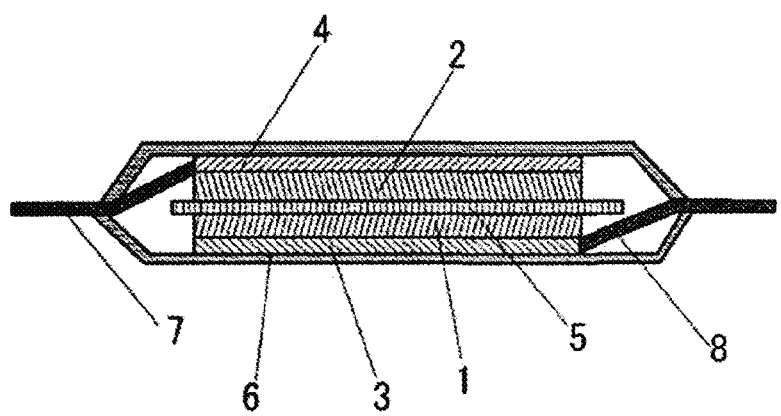

POSITIVE ELECTRODE MIXTURE FOR SECONDARY BATTERY, METHOD FOR MANUFACTURING POSITIVE ELECTRODE FOR SECONDARY BATTERY, AND METHOD FOR MANUFACTURING SECONDARY BATTERY

CROSS REFERENCE TO RELATED APPLICATIONS

This application is a National Stage of International Application No. PCT/JP2016/086734 filed Dec. 9, 2016, claiming priority based on Japanese Patent Application No. 2016-055170 filed Mar. 18, 2016, the entire disclosure of which is incorporated herein by reference.

TECHNICAL FIELD

A present exemplary embodiment relates to a positive electrode mixture for a secondary battery, a method for manufacturing a positive electrode for a secondary battery, and a method for manufacturing a secondary battery.

BACKGROUND ART

Since lithium-ion secondary batteries have a high energy density and a good charge-discharge cycle characteristic, they are widely used as a power source for small-size mobile apparatuses, such as cellular phones and notebook PCs. In recent years, in consideration of environmental issues and also due to heightened awareness of energy saving, the lithium-ion secondary batteries are expected to be applied to large-sized batteries, which are demanded to have a large capacity and a long life, in such fields as electric vehicles, such as hybrid electric vehicles, and electric power storage.

Patent Literatures 1 to 6 disclose a technology of making a positive electrode for a lithium-ion secondary battery by using a positive electrode mixture comprising a positive electrode active material, a binder, and an organic acid.

CITATION LIST

Patent Literature

Patent Literature 1: JP H09-306502A
Patent Literature 2: JP H11-086846A
Patent Literature 3: JP H11-176422A
Patent Literature 4: JP H11-176425A
Patent Literature 5: JP 2001-035495A
Patent Literature 6: JP 2005-011594A

SUMMARY OF THE INVENTION

Technical Problem

However, when the capacity of the lithium-ion secondary battery is further increased by using a lithium nickel complex oxide having a large specific volume per mass as a positive electrode active material and using a vinylidene fluoride-based polymer having a high adhesiveness as a binder, a slurry of the positive electrode mixture may be thickened, which may hinder application of the positive electrode mixture onto a positive electrode current collector. In the case where a large amount of solvent is added to a highly-thickened slurry of the positive electrode mixture to allow application of the slurry onto a positive electrode current collector, a secondary battery made using a thus-obtained positive electrode has a low capacity maintenance rate in a charge-discharge cycle.

An object of the exemplary embodiment is to provide a positive electrode mixture for a secondary battery, where the positive electrode mixture allowing provision of a secondary battery that exhibits a high capacity maintenance rate in the charge-discharge cycle.

Solution to Problem

A positive electrode mixture for a secondary battery according to the exemplary embodiment is a positive electrode mixture for a secondary battery comprising: a positive electrode active material; a binder; and an organic acid, wherein the positive electrode active material comprises a lithium nickel complex oxide having a layered crystal structure, the binder comprises a vinylidene fluoride-based polymer, and when a solution prepared by suspending the positive electrode active material in pure water has a pH of A, and the content of the organic acid per 100 parts by mass of the positive electrode active material is B parts by mass, A and B satisfy the following expression (1).

$$30 \times B + 5 \leq A \leq 30 \times B + 10 \quad (1)$$

A method for manufacturing a positive electrode for a secondary battery according to the exemplary embodiment comprises a step of applying the positive electrode mixture for a secondary battery onto a positive electrode current collector.

A method for manufacturing a secondary battery according to the exemplary embodiment comprises: manufacturing a positive electrode for a secondary battery by the method; and assembling the secondary battery comprising the positive electrode for a secondary battery, and a negative electrode.

Advantageous Effect of Invention

The present exemplary embodiment can provide a positive electrode mixture for a secondary battery, where the positive electrode mixture allowing provision of a secondary battery that exhibits a high capacity maintenance rate in a charge-discharge cycle.

BRIEF DESCRIPTION OF DRAWINGS

FIG. 1 is a sectional view illustrating one example of a secondary battery manufactured by a method for manufacturing a secondary battery according to an exemplary embodiment.

DESCRIPTION OF EMBODIMENT

[Positive Electrode Mixture for Secondary Battery]

A positive electrode mixture for a secondary battery (hereinafter also referred to as a mixture) according to an exemplary embodiment comprises a positive electrode active material, a binder, and an organic acid. The positive electrode active material comprises a lithium nickel complex oxide having a layered crystal structure. The binder comprises a vinylidene fluoride-based polymer. When a solution prepared by suspending the positive electrode active material in pure water has a pH of A, and the content of the organic acid per 100 parts by mass of the positive electrode active material is B parts by mass, A and B satisfy the following expression (1).

$$30 \times B + 5 \leq A \leq 30 \times B + 10 \quad (1)$$

The secondary battery exhibits a high capacity maintenance rate in a charge-discharge cycle, the secondary battery including the positive electrode for a secondary battery that is made using the positive electrode mixture for a secondary battery according to the exemplary embodiment. Although the reason why such a secondary battery can be implemented is not necessarily clear, the following reasons can be considered.

When a vinylidene fluoride-based polymer is used as a binder, the presence of an alkaline component promotes the reaction between the vinylidene fluoride-based polymer and a small amount of moisture, resulting in dehydrofluorination or a crosslinking reaction of the vinylidene fluoride-based polymer. Accordingly, the slurry of the mixture is thickened and gelatinized. As a result, the slurry loses flowability, which makes application of the mixture difficult. Even when the amount of solvent is adjusted to allow application of the mixture, since a crosslinking reaction of the vinylidene fluoride-based polymer locally occurs in the slurry, polymerized vinylidene fluoride-based polymer swells with the solvent, and minute microgels are generated. The presence of the minute microgels causes unevenness of the conductive auxiliary agent in a positive electrode active material layer that is obtained by coating and drying of the mixture. As a consequence, the volume resistivity of the positive electrode itself rises, as a result of which the resistance of the secondary battery increases, and a cycle characteristic deteriorates.

Since the minute microgels are made of vinylidene fluoride-based polymer that is a binder, the binder also unevenly present in the positive electrode active material layer. Accordingly, the strength of adhesion between the positive electrode active material layer and the positive electrode current collector deteriorates, resulting in deterioration of the cycle characteristic.

When a lithium nickel complex oxide having a layered crystal structure is used as the positive electrode active material in particular, a large amount of alkaline components that promote the reaction of the vinylidene fluoride polymer are brought into the mixture, since the lithium nickel complex oxide comprises a large amount of lithium hydroxide and lithium carbonate as impurities.

As a result of intensive examination, the present inventor has found out that when the positive electrode active material comprises the lithium nickel complex oxide having a layered crystal structure and the binder comprises the vinylidene fluoride-based polymer, an optimum amount of organic acid to be added into the mixture varies depending on the pH of the solution prepared by suspending the positive electrode active material in pure water. More specifically, in the exemplary embodiment, when a solution prepared by suspending the positive electrode active material in pure water has a pH of A, and the content of the organic acid per 100 parts by mass of the positive electrode active material is B parts by mass, A and B satisfy the expression (1) and thereby the obtained secondary battery exhibits a high capacity maintenance rate in the charge-discharge cycle.

Meanwhile, when the content of the organic acid is small in the expression (1), it is difficult to suppress the reaction of the vinylidene fluoride polymer caused by the alkaline components derived from the lithium nickel complex oxide. As a result, the slurry of the mixture thickens, and application of the mixture becomes difficult. In the case where the solvent is excessively added to decrease the viscosity of the thickened slurry and to thereby allow application of the mixture, the cycle characteristic deteriorates due to the above-stated generation of the minute microgels. Since the binder is also unevenly present as described before, the strength of adhesion between the positive electrode active material layer and the positive electrode current collector deteriorates, which causes deterioration of the cycle characteristic.

When the content of the organic acid is large in the expression (1), the organic acid changes the crystal structure of the vinylidene fluoride polymer at the time of drying of the mixture. As a result, the strength of adhesion between the positive electrode active material layer and the positive electrode current collector deteriorates, resulting in deterioration of the cycle characteristic.

The positive electrode mixture for a secondary battery according to the exemplary embodiment can be a positive electrode mixture for a lithium-ion secondary battery. Hereinafter, each configuration in the exemplary embodiment will be described in detail.

<Positive Electrode Active Material>

The positive electrode active material according to the exemplary embodiment comprises a lithium nickel complex oxide having a layered crystal structure. The lithium nickel complex oxide is not particularly limited as long as it has a layered crystal structure. However, a lithium nickel complex oxide represented by $Li_\alpha Ni_x M_{1-x} O_2$ (provided that $0 < \alpha \leq 1.15$, $0.2 \leq x \leq 0.9$, and M is at least one selected from the group consisting of Co, Mn, Mg, and Al) is preferable. In the expression, a is preferably $0.2 \leq \alpha \leq 1.10$, and more preferably $0.5 \leq \alpha \leq 1.05$. From the viewpoint of increasing the capacity of the secondary battery, x is preferably $0.3 \leq x \leq 0.87$, and more preferably $0.4 \leq x \leq 0.85$. One lithium nickel complex oxide may be used, or two or more lithium nickel complex oxides may be used in combination. The method for manufacturing the lithium nickel complex oxide is not particularly limited. The lithium nickel complex oxide may be manufactured by a publicly-known method. For example, the lithium nickel complex oxide may be manufactured according to the method disclosed in JP3897387B.

Whether or not the lithium nickel complex oxide has a layered crystal structure is determined by powder X-ray diffraction measurement. The amount of the lithium nickel complex oxide having a layered crystal structure and contained in the positive electrode active material of 100% by mass is preferably 50% by mass or more, more preferably 80% by mass or more, and still more preferably 90% by mass or more. It is particularly preferable that the amount of the lithium nickel complex oxide is 100% by mass, that is, the positive electrode active material is made of the lithium nickel complex oxide having a layered crystal structure.

In the expression (1), the pH (A) of the solution prepared by suspending the positive electrode active material in pure water is preferably 8 to 14, and more preferably 9 to 13 from the viewpoint of enhancing the capacity maintenance rate in the charge-discharge cycle. The pH (A) of the solution prepared by suspending the positive electrode active material in pure water in the expression (1) is a value measured according to JIS K5101-17-2. Specifically, the pH of a supernatant liquid, obtained by adding 100 $cm^3$ of water and 2 g of the positive electrode active material into a glass container, mixing the content for five minutes, and leaving the content at rest for thirty seconds, is measured according to JIS Z8802. The pH is measured by a hydrogen ion meter using glass electrodes (tradename: HM-40V, made by DKK-TOA Corporation). The pH is measured at 27° C.

The average particle size of the positive electrode active material is preferably 5 to 20 μm, and more preferably 7 to 15 μm from the viewpoint of applicability of the mixture and output characteristics of the secondary battery. The BET specific surface area of the positive electrode active material is preferably 0.1 to 2.0 m$^2$/g, and more preferably 0.2 to 1.0 m$^2$/g from the viewpoint of the output characteristics of the secondary battery. The average particle size refers to a particle diameter (median diameter: D50) at cumulative value of 50% in a particle size distribution (volumetric basis) by a laser diffraction scattering method. The BET specific surface area is a value measured by a BET method.

Although a solid content ratio of the positive electrode active material in the positive electrode mixture for a secondary battery is not particularly limited, the solid content ratio may be set to 85 to 96% by mass, for example.

<Binder>

The binder according to the exemplary embodiment comprises a vinylidene fluoride-based polymer. Although the vinylidene fluoride-based polymer is not particularly limited, examples of the vinylidene fluoride-based polymer may include vinylidene fluoride homopolymer, vinylidene fluoride copolymer, and modified compounds thereof. Specific examples include polyvinylidene fluoride (PVDF). One of these substances may be used, or two or more thereof may be used in combination. The amount of the vinylidene fluoride-based polymer contained in the binder of 100% by mass is preferably 80% by mass or more, and more preferably 90% by mass or more. It is still more preferable that the amount of the vinylidene fluoride-based polymer is 100% by mass, that is, the binder is made of the vinylidene fluoride-based polymer.

The content of the vinylidene fluoride-based polymer per 100 parts by mass of the positive electrode active material is preferably 1 to 10 parts by mass, and more preferably 2 to 7 parts by mass. When the content is 1 part by mass or more, peeling of the positive electrode active material layer is suppressed. When the content is 10 parts by mass or less, the ratio of the positive electrode active material in the positive electrode active material layer becomes larger, and so the capacity per mass becomes larger. The solid content ratio of the vinylidene fluoride-based polymer in the positive electrode mixture for a secondary battery is preferably 1 to 10% by mass, and more preferably 2 to 7% by mass.

<Organic Acid>

Although the organic acid according to the exemplary embodiment is not particularly limited, oxalic acid, malonic acid, succinic acid, glutaric acid, adipic acid, pimelic acid, suberic acid, azelaic acid, sebacic acid, phthalic acid, and fumaric acid are preferable from the viewpoint of the effect of characteristic improvement. One of these acids may be used, or two or more thereof may be used in combination. Among these acids, oxalic acid is more preferable as the organic acid.

The content of the organic acid (B parts by mass) per 100 parts by mass of the positive electrode active material satisfies the expression (1) in a relationship with the pH (A) of the solution prepared by suspending the positive electrode active material in pure water. A and B preferably satisfy the following expression (2), more preferably satisfy the following expression (3), and particularly preferably satisfy the following expression (4).

$$30 \times B + 6 \leq A \leq 30 \times B + 9.5 \quad (2)$$

$$30 \times B + 7 \leq A \leq 30 \times B + 9 \quad (3)$$

$$A = 30 \times B + 8 \quad (4)$$

The content of the organic acid (B parts by mass) per 100 parts by mass of the positive electrode active material is preferably 0.03 to 0.50 parts by mass, more preferably 0.04 to 0.30 parts by mass, and still more preferably 0.05 to 0.15 parts by mass from the viewpoint of enhancing the capacity maintenance rate in the charge-discharge cycle.

<Conductive Auxiliary Agent>

The positive electrode mixture for a secondary battery according to the exemplary preferably comprises a conductive auxiliary agent from the viewpoint of enhancing the effect of the exemplary embodiment and also the conductivity of the positive electrode active material layer. Although the conductive auxiliary agent is not particularly limited, examples of the conductive auxiliary agent may include carbon black, Ketchen black, acetylene black, natural graphite, artificial graphite, and carbon fibers. One of these substances may be used, or two or more thereof may be used in combination.

The content of the conductive auxiliary agent per 100 parts by mass of the positive electrode active material is preferably 1 to 10 parts by mass, and more preferably 2 to 7 parts by mass. Good conductivity is provided when the content is 1 part by mass or more. When the content is 10 parts by mass or less, the ratio of the positive electrode active material in the positive electrode active material layer becomes larger, and so the capacity per mass becomes larger. The solid content ratio of the conductive auxiliary agent in the positive electrode mixture for a secondary battery is preferably 1 to 10% by mass, and more preferably 2 to 7% by mass.

<Solvent>

The positive electrode mixture for a secondary battery according to the exemplary embodiment can comprise a solvent. As the solvent, an organic solvent that can dissolve a vinylidene fluoride-based polymer can be used. Examples of the organic solvent may include N-methyl-pyrrolidone (NMP).

[Method for Manufacturing Positive Electrode for Secondary Battery]

A method for manufacturing a positive electrode for a secondary battery according to the exemplary embodiment comprises a step of applying a positive electrode mixture for a secondary battery according to the exemplary embodiment onto a positive electrode current collector. According to the method, the positive electrode for a secondary battery that exhibits a high capacity maintenance rate in the charge-discharge cycle can be manufactured. The positive electrode for a secondary battery can be a positive electrode for a lithium-ion secondary battery.

Examples of the material of the positive electrode current collector may include aluminum, stainless steel, nickel, titanium, or alloys thereof. The positive electrode current collector may have a shape such as a foil shape, a plate shape, and a mesh shape. As the positive electrode current collector, an aluminum foil is preferable in particular. Although the thickness of the positive electrode current collector is not particularly limited, it may be set to 10 to 50 μm, for example.

As an apparatus for forming a positive electrode active material layer by applying the positive electrode mixture for a secondary battery onto the positive electrode current collector, apparatuses that perform various coating methods, such as a doctor blade, a die coater, a gravure coater, a transfer method, a deposition method, and a combination of these coating apparatuses may be used. Among these coating apparatuses, the die coater is preferably used from the viewpoint that an end portion of the positive electrode active material layer can be formed with sufficient precision. The coating method of the positive electrode mixture for a secondary battery with the die coater is mainly divided into two types including a continuous coating method and an intermittent coating method. The continuous coating method is for continuously coating the positive electrode mixture for a secondary battery on a long positive electrode current collector along a longitudinal direction of the positive electrode current collector. The intermittent coating method is for repeatedly and alternately forming a portion coated with the positive electrode mixture for a secondary battery and a portion uncoated with the positive electrode mixture along the longitudinal direction of the positive electrode current collector. The coating method may suitably be selected from these two methods.

The thickness of the positive electrode active material layer is not particularly limited, and can suitably be set in accordance with desired characteristics. For example, the positive electrode active material layer can be set to be thick from the viewpoint of energy density. The positive electrode active material layer may be set to be thin from the viewpoint of the output characteristics. The thickness of the positive electrode active material layer can suitably be set, for example, in the range of 10 to 250 µm. The thickness of the positive electrode active material layer is preferably 20 to 200 µm, and more preferably 50 to 180 µm. The density of the positive electrode active material layer is preferably 2.55 to 3.45 g/cm$^3$. When the density of the positive electrode active material layer is within the range, the discharge capacity when the positive electrode is used at a high discharge rate is enhanced.

[Method for Manufacturing Secondary Battery]

A method for manufacturing a secondary battery according to the exemplary embodiment includes a step of manufacturing a positive electrode for a secondary battery by the method according to the exemplary embodiment; and a step of assembling the secondary battery including the positive electrode for a secondary battery, and a negative electrode. The method makes it possible to manufacture the secondary battery that exhibits a high capacity maintenance rate in the charge-discharge cycle. The secondary battery can be a lithium-ion secondary battery.

One example of a laminated secondary battery manufactured by the method for manufacturing a secondary battery according to the exemplary embodiment is illustrated in FIG. 1. The secondary battery illustrated in FIG. 1 has a positive electrode and a negative electrode. The positive electrode includes a positive electrode current collector 3, and a positive electrode active material layer 1 comprising a positive electrode active material provided on the positive electrode current collector 3. The negative electrode includes a negative electrode current collector 4, and a negative electrode active material layer 2 comprising a negative electrode active material provided on the negative electrode current collector 4. The positive electrode and the negative electrode are laminated through a separator 5 such that the positive electrode active material layer 1 and the negative electrode active material layer 2 face each other. The electrode pair is housed in an outer packaging 6. Although one electrode pair is housed in the outer packaging 6 in FIG. 1, an electrode group made up of a plurality of laminated electrode pairs may be housed in the outer packaging 6. Other than the laminated electrodes, the electrodes may be wound electrodes. The positive electrode current collector 3 is connected to a positive electrode tab 8. The negative electrode current collector 4 is connected to a negative electrode tab 7. These tabs are pulled out from the outer packaging 6. An electrolyte solution not shown is injected in the outer packaging 6. The secondary battery can be manufactured according to a publicly-known method. The secondary battery may have any shape, such as a coin shape, a button shape, a sheet shape, a cylindrical shape, a square shape, and a flat shape.

<Negative Electrode>

The negative electrode according to the exemplary embodiment can be a negative electrode that enables lithium to be inserted therein and be removed therefrom. The negative electrode can include a negative electrode active material layer comprising a negative electrode active material, and also comprising a binder and a conductive auxiliary agent as necessary. The negative electrode according to the exemplary embodiment can include a negative electrode current collector and the negative electrode active material layer provided on the negative electrode current collector.

As the negative electrode active material, materials capable of occluding and releasing lithium can be used, the materials including lithium metal, carbon materials, and Si-based materials. Examples of the carbon materials may include graphite, amorphous carbon, diamond-like carbon, fulleren, carbon nanotubes, and carbon nanohorns that occlude lithium. As the Si-based materials, materials such as Si, $SiO_2$, $SiO_x$ (0<x≤2), and Si-contained composite materials can be used. A composite comprising two or more types of these materials may also be used.

When the negative electrode active material is in a particle state, the average particle size of the negative electrode active material is preferably 1 µm or more, more preferably 2 µm or more, and still more preferably 5 µm or more from the viewpoint that a side reaction at the time of charging and discharging can be suppressed and that the deterioration of the charging and discharging efficiency can be suppressed. From the viewpoint of input-output characteristics and making the negative electrode, such as smoothness of the surface of the negative electrode, the average particle size is preferably 80 µms or less, and more preferably 40 µms or less. The average particle size refers to a particle diameter (median diameter: D50) at cumulative value of 50% in a particle size distribution (volumetric basis) by a laser diffraction scattering method.

When lithium metal is used as the negative electrode active material, the negative electrode can be formed by methods such as a melt-quenching method, a liquid-quenching method, an atomization method, a vacuum deposition method, a sputtering method, a plasma CVD method, an optical CVD method, a heat CVD method, and a sol-gel method. When a carbon material is used as the negative electrode active material, the negative electrode can be formed by a method involving, for example, mixing the carbon material with a binder such as PVDF, kneading the mixture in the state of being dispersed in a solvent such as NMP, and coating the kneaded mixture on the negative electrode current collector. The negative electrode can also be formed by methods, such as a deposition method, a CVD method, and a spattering method.

As the binder and the conductive auxiliary agent, the same ones as the binder and the conductive auxiliary agent usable for the positive electrode mixture described before can be used.

As the negative electrode current collector, copper, stainless steel, nickel, titanium, or alloys thereof can be used.

<Electrolyte Solution>

As the electrolyte solution, a nonaqueous electrolyte solution can be used. The electrolyte solution can comprise an organic solvent and lithium salt, for example. As the organic solvent, cyclic carbonates such as ethylene carbonate (EC), propylene carbonate (PC), vinylene carbonate (VC), and butylene carbonate (BC); chain carbonates such as ethyl methyl carbonate (EMC), diethyl carbonate (DEC), dimethyl carbonate (DMC), and dipropyl carbonate (DPC); aliphatic carboxylic acid esters; γ-lactones such as γ-butyrolactone; chain ethers; cyclic ethers, and the like can be used. One of these substances may be used, or two or more thereof may be used in combination. Examples of the lithium salt may include a lithium imido salt, $LiPF_6$, $LiAsF_6$, $LiAlCl_4$, $LiClO_4$, $LiBF_4$, and $LiSbF_6$. One of these substances may be used, or two or more thereof may be used in combination.

<Separator>

The separator can be a porous membrane made of resin, a woven fabric, and a nonwoven fabric. Examples of the resin may include polyolefin resin, such as polypropylene and polyethylene, polyester resin, acrylic resin, styrene resin, and nylon resin. One of these substances may be used, or two or more thereof may be used in combination. Among these, a polyolefin-based fine porous membrane is preferable in particular as it is excellent in ionic permeability and in the performance of physically separating the positive electrode and the negative electrode. In the separator, a layer comprising inorganic particles may be formed as necessary. Examples of the inorganic particles may include insulating oxides, nitrides, sulfides, and carbides. One of these substances may be used, or two or more thereof may be used in combination. Among these, $TiO_2$ and $Al_2O_3$ are preferable as the inorganic particles.

<Outer Packaging>

As the outer packaging, a case made of a flexible film, a can case, and the like can be used. Among these, it is preferable to use the flexible film from the viewpoint of reducing the weight of the secondary battery. The flexible film may be formed by providing a resin layer on at least one surface of a metal layer serving as a substrate. The metal layer may be made of a material selected from those having a barrier property that can prevent leakage of an electrolyte solution, invasion of moisture from the outside, and the like. Examples of the material may include aluminum, and stainless steel. A heat-sealable resin layer made of modified polyolefin or the like can be provided at least on one surface of the metal layer. When the flexible film is used for the outer packaging, the outer packaging is formed by making the heat-sealable resin layers of the flexible films face each other, and sealing the periphery of a portion for housing the electrode pair with heat. On another outer packaging surface that is opposite to the surface where the heat-sealable resin layer is formed, a resin layer made of a nylon film, a polyester film, or the like can be provided.

EXAMPLES

Examples 1 to 4, and Comparative Examples 1 to 3

As the positive electrode active material, a lithium nickel complex oxide ($LiNi_{0.80}Co_{0.15}Al_{0.05}O_2$) having a layered crystal structure with an average particle size of 8.4 μm and a BET specific surface area of 0.44 $m^2/g$ was prepared. The pH of a solution prepared by suspending the lithium nickel complex oxide in pure water was 12.5. Dry blending of 100 parts by mass of the lithium nickel complex oxide and 4.3 parts by mass of carbon black serving as a conductive auxiliary agent was performed. The obtained mixture, and 4.3 parts by mass of polyvinylidene fluorides (PVDF) as a binder, and oxalic acid as the organic acid were added into N-methyl-2-pyrrolidone (NMP), and were dispersed uniformly to obtain a positive electrode mixture for a secondary battery. The amount of oxalic acid to be added as the organic acid was as shown in Table 1. The solid content ratio of carbon black in the positive electrode mixture for a secondary battery was 4% by mass. The solid content ratio of PVDF in the positive electrode mixture for a secondary battery was 4% by mass. The solid content ratio of lithium nickel complex oxide in the positive electrode mixture for a secondary battery was 91.8 to 92.0% by mass.

The positive electrode mixture for a secondary battery was coated on an aluminum foil with a thickness of 20 μm, the aluminum foil serving as a positive electrode current collector. By drying the positive electrode mixture, NMP was evaporated to form a positive electrode active material layer with a thickness of 85 μm on the positive electrode current collector. Thus, the positive electrode for a secondary battery was obtained.

Natural graphite as the negative electrode active material and PVDF as the binder were mixed to have a ratio of natural graphite:PVDF=90:10 (mass ratio). The mixture was dispersed in NMP to obtain a negative electrode mixture for a secondary battery. The negative electrode mixture for a secondary battery was coated on a copper foil with a thickness of 10 μm, the copper foil serving as a negative electrode current collector. By drying the negative electrode mixture, NMP was evaporated to make a negative electrode for a secondary battery. The positive electrode for a secondary battery and the negative electrode for a secondary battery were laminated through a separator made of polyethylene. The electrode pair was enclosed, together with an electrolyte solution that comprises $LiPF_6$ as an electrolyte at a concentration of 1 mol/L, in the outer packaging to make a secondary battery.

Examples 5 to 9 and Comparative Examples 4 and 5

As the positive electrode active material, a mixture (mixing ratio of 1:1 (mass ratio)) of a lithium nickel complex oxide ($LiNi_{0.8}Co_{0.1}Mn_{0.1}O_2$) and a lithium nickel complex oxide ($LiNi_{0.5}Co_{0.2}Mn_{0.3}O_2$) was prepared, the lithium nickel complex oxide ($LiNi_{0.8}Co_{0.1}Mn_{0.1}O_2$) having a layered crystal structure with an average particle size of 8.1 μm and a BET specific surface area of 0.42 $m^2/g$, the lithium nickel complex oxide ($LiNi_{0.5}Co_{0.2}Mn_{0.3}O_2$) having a layered crystal structure with an average particle size of 7.9 μm and a BET specific surface area of 0.30 $m^2/g$. The pH of a solution prepared by suspending the mixture in pure water was 11.6. A positive electrode mixture for a secondary battery, a positive electrode for a secondary battery, and a secondary battery were made in the same manner as in Example 1 except that the mixture was used as the positive electrode active material. The amount of oxalic acid to be added as the organic acid was as shown in Table 2.

Examples 10 to 13 and Comparative Examples 6 and 7

As the positive electrode active material, a mixture (mixing ratio of 1:1 (mass ratio)) of a lithium nickel complex oxide ($LiNi_{0.80}Co_{0.15}Al_{0.05}O_2$) and a lithium manganese complex oxide ($Li_{1.1}Mn_{1.9}O_4$) was prepared, the lithium nickel complex oxide ($LiNi_{0.80}Co_{0.15}Al_{0.05}O_2$) having a layered crystal structure with an average particle size of 8.4 μm and a BET specific surface area of 0.44 $m^2/g$, the lithium manganese complex oxide ($Li_{1.1}Mn_{1.9}O_4$) having a layered crystal structure with an average particle size of 10.1 μm and a BET specific surface area of 0.80 $m^2/g$. The pH of a solution prepared by suspending the mixture in pure water was 10.1. A positive electrode mixture for a secondary battery, a positive electrode for a secondary battery, and a secondary battery were made in the same manner as in Example 1 except that the mixture was used as the positive electrode active material. The amount of oxalic acid to be added as the organic acid was as shown in Table 3.

Examples 14, 15, and Comparative Examples 8 to 10

As the positive electrode active material, a mixture (mixing ratio of 2:8 (mass ratio)) of a lithium nickel complex oxide ($LiNi_{0.80}Co_{0.15}Al_{0.05}O_2$) and a lithium manganese complex oxide ($Li_{1.1}Mn_{1.9}O_4$) was prepared, the lithium nickel complex oxide ($LiNi_{0.80}Co_{0.15}Al_{0.05}O_2$) having a layered crystal structure with an average particle size of 8.4 μm and a BET specific surface area of 0.44 $m^2/g$, the lithium manganese complex oxide ($Li_{1.1}Mn_{1.9}O_4$) having a layered crystal structure with an average particle size of 10.1 μm and a BET specific surface area of 0.80 $m^2/g$. The pH of a solution prepared by suspending the mixture in pure water was 8.9. A positive electrode mixture for a secondary battery, a positive electrode for a secondary battery, and a secondary battery were made in the same manner as in Example 1 except that the mixture was used as the positive electrode active material. The amount of oxalic acid to be added as the organic acid was as shown in Table 4.

Examples 16 to 20

A positive electrode mixture for a secondary battery, a positive electrode for a secondary battery, and a secondary battery were made in the same manner as in Example 1 except that the organic acid shown in Table 5 was used as the organic acid, and 0.15 parts by mass of the organic acid were added.

(Evaluation)

High-temperature cycle characteristics of the secondary batteries made in each of Examples and Comparative Examples were evaluated. Specifically, a charge-discharge cycle was performed at a temperature of 45° C. under conditions of a charge rate of 1.0 C, a discharge rate of 1.0 C, a charge termination voltage of 4.2 V, and a discharge termination voltage of 2.5 V. A value obtained by dividing a discharge capacity (mAh) after 500 cycles by a discharge capacity (mAh) in the 10th cycle was used as a capacity maintenance rate (%). Results are as shown in Tables 1 to 5.

TABLE 1

|  | pH (A) | Organic acid content (B) (parts by mass) | 30 × B + 5 | 30 × B + 10 | Capacity maintenance rate (%) |
| --- | --- | --- | --- | --- | --- |
| Comparative Example 1 | 12.5 | 0.00 | 5.0 | 10.0 | 69.5 |
| Comparative Example 2 | 12.5 | 0.03 | 5.9 | 10.9 | 72.9 |
| Comparative Example 3 | 12.5 | 0.07 | 7.1 | 12.1 | 77.0 |
| Example 1 | 12.5 | 0.10 | 8.0 | 13.0 | 80.4 |
| Example 2 | 12.5 | 0.12 | 8.6 | 13.6 | 83.7 |
| Example 3 | 12.5 | 0.15 | 9.5 | 14.5 | 86.1 |
| Example 4 | 12.5 | 0.20 | 11.0 | 16.0 | 82.3 |

TABLE 2

|  | pH (A) | Organic acid content (B) (parts by mass) | 30 × B + 5 | 30 × B + 10 | Capacity maintenance rate (%) |
| --- | --- | --- | --- | --- | --- |
| Comparative Example 4 | 11.6 | 0.00 | 5.0 | 10.0 | 75.2 |
| Comparative Example 5 | 11.6 | 0.03 | 5.9 | 10.9 | 78.3 |
| Example 5 | 11.6 | 0.07 | 7.1 | 12.1 | 82.4 |
| Example 6 | 11.6 | 0.10 | 8.0 | 13.0 | 86.1 |
| Example 7 | 11.6 | 0.12 | 8.6 | 13.6 | 87.1 |
| Example 8 | 11.6 | 0.15 | 9.5 | 14.5 | 85.4 |
| Example 9 | 11.6 | 0.20 | 11.0 | 16.0 | 80.3 |

TABLE 3

|  | pH (A) | Organic acid content (B) (parts by mass) | 30 × B + 5 | 30 × B + 10 | Capacity maintenance rate (%) |
| --- | --- | --- | --- | --- | --- |
| Comparative Example 6 | 10.1 | 0.00 | 5.0 | 10.0 | 79.5 |
| Example 10 | 10.1 | 0.03 | 5.9 | 10.9 | 83.0 |
| Example 11 | 10.1 | 0.07 | 7.1 | 12.1 | 86.2 |
| Example 12 | 10.1 | 0.10 | 8.0 | 13.0 | 84.3 |
| Example 13 | 10.1 | 0.12 | 8.6 | 13.6 | 81.4 |
| Comparative Example 7 | 10.1 | 0.20 | 11.0 | 16.0 | 70.1 |

TABLE 4

|  | pH (A) | Organic acid content (B) (parts by mass) | 30 × B + 5 | 30 × B + 10 | Capacity maintenance rate (%) |
|---|---|---|---|---|---|
| Comparative Example 8 | 8.9 | 0.00 | 5.0 | 10.0 | 78.6 |
| Example 14 | 8.9 | 0.03 | 5.9 | 10.9 | 82.0 |
| Example 15 | 8.9 | 0.07 | 7.1 | 12.1 | 80.3 |
| Comparative Example 9 | 8.9 | 0.15 | 9.5 | 14.5 | 74.3 |
| Comparative Example 10 | 8.9 | 0.20 | 11.0 | 16.0 | 71.6 |

TABLE 5

|  | Organic acid | pH (A) | Organic acid content (B) (parts by mass) | 30 × B + 5 | 30 × B + 10 | Capacity maintenance rate (%) |
|---|---|---|---|---|---|---|
| Example 16 | Malonic acid | 12.5 | 0.15 | 9.5 | 14.5 | 84.8 |
| Example 17 | Succinic acid | 12.5 | 0.15 | 9.5 | 14.5 | 80.3 |
| Example 18 | Glutaric acid | 12.5 | 0.15 | 9.5 | 14.5 | 83.4 |
| Example 19 | Adipic acid | 12.5 | 0.15 | 9.5 | 14.5 | 84.6 |
| Example 20 | Pimelic acid | 12.5 | 0.15 | 9.5 | 14.5 | 81.9 |

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

REFERENCE SIGNS LIST

1 Positive electrode active material layer
2 Negative electrode active material layer
3 Positive electrode current collector
4 Negative electrode current collector
5 Separator
6 Outer packaging
7 Negative electrode tab
8 Positive electrode tab

The invention claimed is:

1. A positive electrode mixture for a secondary battery, comprising:
a positive electrode active material;
a binder; and
an organic acid, wherein
the positive electrode active material comprises a lithium nickel complex oxide having a layered crystal structure,
the binder comprises a vinylidene fluoride-based polymer,
the positive electrode mixture is configured such that A and B satisfy the following expression (1):

$$30 \times B + 5 \leq A \leq 30 \times B + 10 \quad (1),$$

in the expression (1), A is a pH of a supernatant liquid obtained by adding 100 cm$^3$ of pure water and 2 g of the positive electrode active material, then mixing for five minutes, and then leaving for thirty seconds, the pH (A) being measured at 27° C., and B is a content in parts by mass of the organic acid per 100 parts by mass of the positive electrode active material,
the content (B) of the organic acid per 100 parts by mass of the positive electrode active material is 0.03 parts by mass or more and 0.20 parts by mass or less,
the pH (A) of the solution is 8.9 or more and 12.5 or less, and
the lithium nickel complex oxide having a layered crystal structure is represented by $Li_\alpha Ni_x M_{1-x} O_2$, where $0 < \alpha \leq 1.15$, $0.2 \leq x \leq 0.9$, and M is Co and Al.

2. The positive electrode mixture for a secondary battery according to claim 1, wherein the organic acid is at least one selected from the group consisting of oxalic acid, malonic acid, succinic acid, glutaric acid, adipic acid, pimelic acid, suberic acid, azelaic acid, sebacic acid, phthalic acid, and fumaric acid.

3. The positive electrode mixture for a secondary battery according to claim 1, further comprising a conductive auxiliary agent.

4. A method for manufacturing a positive electrode for a secondary battery, comprising a step of applying a positive electrode mixture for a secondary battery according to claim 1 onto a positive electrode current collector.

5. A method for manufacturing a secondary battery, comprising:
manufacturing a positive electrode for a secondary battery by a method according to claim 4; and
assembling the secondary battery comprising the positive electrode for a secondary battery, and a negative electrode.

6. A positive electrode mixture for a secondary battery, comprising:
a positive electrode active material;
a binder; and
an organic acid, wherein
the positive electrode active material comprises a lithium nickel complex oxide having a layered crystal structure,
the binder comprises a vinylidene fluoride-based polymer,
the positive electrode mixture is configured such that A and B satisfy the following expression (1):

$$30 \times B + 5 \leq A \leq 30 \times B + 10 \quad (1),$$

in the expression (1), A is a pH of a supernatant liquid obtained by adding 100 cm$^3$ of pure water and 2 g of the positive electrode active material, then mixing for five minutes, and then leaving for thirty seconds, the pH (A) being measured at 27° C., and B is a content in parts by mass of the organic acid per 100 parts by mass of the positive electrode active material,
the content (B) of the organic acid per 100 parts by mass of the positive electrode active material is 0.03 parts by mass or more and 0.20 parts by mass or less,
the pH (A) of the solution is 8.9 or more and 12.5 or less, and
the lithium nickel complex oxide having a layered crystal structure is represented by $Li_\alpha Ni_x M_{1-x} O_2$, where $0<\alpha\leq 1.15$, $0.4\leq x\leq 0.85$, and M is at least one selected from the group consisting of Co, Mn, Mg and Al.

7. The positive electrode mixture for a secondary battery according to claim 6, wherein the organic acid is at least one selected from the group consisting of oxalic acid, malonic acid, succinic acid, glutaric acid, adipic acid, pimelic acid, suberic acid, azelaic acid, sebacic acid, phthalic acid, and fumaric acid.

8. The positive electrode mixture for a secondary battery according to claim 6, further comprising a conductive auxiliary agent.

9. A method for manufacturing a positive electrode for a secondary battery, comprising a step of applying a positive electrode mixture for a secondary battery according to claim 6 onto a positive electrode current collector.

10. A method for manufacturing a secondary battery, comprising:
- manufacturing a positive electrode for a secondary battery by a method according to claim 9; and
- assembling the secondary battery comprising the positive electrode for a secondary battery, and a negative electrode.

* * * * *